(12) United States Patent
Goodenough et al.

(10) Patent No.: US 11,049,667 B2
(45) Date of Patent: *Jun. 29, 2021

(54) HEAT ENERGY-POWERED ELECTROCHEMICAL CELLS

(71) Applicant: Hydro-Quebec, Quebec (CA)

(72) Inventors: John B. Goodenough, Austin, TX (US); Maria Helena Sousa Soares De Oliveira Braga, Austin, TX (US); Andrew Murchison, San Jose, CA (US)

(73) Assignee: Hydro-Quebec, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,081

(22) Filed: Sep. 1, 2020

(65) Prior Publication Data
US 2020/0402729 A1 Dec. 24, 2020

Related U.S. Application Data

(63) Continuation of application No. 16/691,344, filed on Nov. 21, 2019, now Pat. No. 10,804,040, which is a
(Continued)

(51) Int. Cl.
*H01G 9/21* (2006.01)
*H01M 10/0562* (2010.01)
(Continued)

(52) U.S. Cl.
CPC .............. *H01G 9/21* (2013.01); *H01G 11/10* (2013.01); *H01G 11/56* (2013.01); *H01M 6/18* (2013.01);
(Continued)

(58) Field of Classification Search
CPC ................. H01M 10/056–0562; H01M 14/00
See application file for complete search history.

(56) References Cited

U.S. PATENT DOCUMENTS 4,307,163 A 12/1981 Joshi et al.
5,279,910 A 1/1994 Sasaki et al.
(Continued)

FOREIGN PATENT DOCUMENTS

CA 2267319 4/1998
CA 2940598 9/2015
(Continued)

OTHER PUBLICATIONS

"NRL's Sodium Sulfur Battery Experiment Flies Aboard STS-87." NRL's Sodium Sulfur Battery Experiment Flies Aboard STS-87—U.S. Naval Research Laboratory, www.nrl.navy.mil/media/news-releases/1997/nrls-sodium-sulfur-battery-experiment-flies-aboard-sts87; 1 page, 1997.
(Continued)

*Primary Examiner* — Karie O'Neill Apicella
(74) *Attorney, Agent, or Firm* — Baker Botts L.L.P.

(57) ABSTRACT

The present disclosure provides a heat energy-powered electrochemical cell including an anode, a cathode, and a solid metal polymer/glass electrolyte. The solid metal polymer/glass electrolyte includes between 1% and 50% metal polymer by weight as compared to total solid metal polymer/glass electrolyte weight and between 50% and 90% solid glass electrolyte by weight as compared to the total solid metal polymer/glass electrolyte weight. The solid glass electrolyte includes a working cation and an electric dipole. The heat energy-powered electrochemical cells may be used to capture heat from a variety of sources, including solar hear, waste heat, and body heat. The heat energy-powered electrochemical cells may be fabricated at large-area, thin cells.

31 Claims, 1 Drawing Sheet
(1 of 1 Drawing Sheet(s) Filed in Color)

Related U.S. Application Data continuation of application No. 15/782,443, filed on Oct. 12, 2017, now Pat. No. 10,490,360.

(51) Int. Cl.
  *H01M 14/00*  (2006.01)
  *H01M 10/056*  (2010.01)
  *H01M 6/18*  (2006.01)
  *H01G 11/10*  (2013.01)
  *H01G 11/56*  (2013.01)

(52) U.S. Cl.
  CPC ..... *H01M 10/056* (2013.01); *H01M 10/0562* (2013.01); *H01M 14/00* (2013.01); *H01M 2300/0068* (2013.01); *H01M 2300/0082* (2013.01); *H01M 2300/0091* (2013.01)

(56) References Cited

U.S. PATENT DOCUMENTS

| | | |
|---|---|---|
| 5,547,782 A | 8/1996 | Dasgupta et al. |
| 5,631,532 A | 5/1997 | Azuma et al. |
| 2004/0106046 A1 | 6/2004 | India |
| 2007/0003833 A1 | 1/2007 | Li et al. |
| 2007/0148553 A1 | 6/2007 | Weppner |
| 2012/0227926 A1* | 9/2012 | Field ............ F24S 60/10 165/10 |
| 2012/0295147 A1 | 11/2012 | Liu et al. |
| 2013/0202971 A1 | 8/2013 | Zhao et al. |
| 2013/0344363 A1 | 12/2013 | Upadhyaya |
| 2014/0113187 A1 | 4/2014 | Winoto et al. |
| 2014/0141318 A1 | 5/2014 | Lee et al. |
| 2014/0272564 A1 | 9/2014 | Holme et al. |
| 2015/0303456 A1* | 10/2015 | Yoo ............. H01M 4/38 429/217 |
| 2015/0364788 A1 | 12/2015 | Lu et al. |
| 2016/0190640 A1 | 6/2016 | Visco et al. |
| 2016/0365602 A1* | 12/2016 | Sousa Soares De Oliveira Braga ............. H01M 16/00 |
| 2016/0368777 A1 | 12/2016 | Goodenough et al. |

FOREIGN PATENT DOCUMENTS

| | | |
|---|---|---|
| CN | 101811828 | 8/2010 |
| CN | 102249350 | 11/2011 |
| CN | 103268930 | 9/2015 |
| EP | 3111503 | 1/2017 |
| KR | 20160142293 | 12/2016 |
| WO | 2012/112229 | 8/2012 |
| WO | 2013/077863 | 5/2013 |
| WO | 2016/026130 | 8/2014 |
| WO | 2015/128834 | 9/2015 |
| WO | WO-2015128834 A1 * | 9/2015 ............. H01G 11/56 |
| WO | 2016/142927 | 9/2016 |
| WO | 2016/157083 | 10/2016 |
| WO | 2016/205064 | 12/2016 |

OTHER PUBLICATIONS

Alcantara, R., Lavela, P., Ortiz, G. F., Tirado, J. L, Carbon Microspheres Obtained from Resorcinol-Formaldehyde as High-Capacity Electrodes for Sodium-Ion Batteries. Electrochem. Solid-Stote Lett, 8, A222 (2005); 4 pages, 2005.

Angell, C. Austin, et al. "Relaxation in glassforming liquids and amorphous solids." Journal of Applied Physics 88.6 (2000): 3113-3157; 45 pages, 2000.

Angell, C. Austin. "Dynamic processes in ionic glasses." Chemical Reviews 90.3 (1990): 523-542; 20 pages, 1990.

Auxer, W. The PB sodium sulfur cell for satellite battery applications. Proceedings of the International Power Sources Symposium, 32nd, Cherry Hill, NJ (Pennington, NJ: Electrochemical Society). A88-16601 04-44: 49-54. (1986); 7 pages.

BeauHD, "The Slashdot Interview with Lithium-Ion Battery Inventor John B. Goodenough." Posted Apr. 19, 2017, retrieved from <https://hardware.slashdot.org/story/17/04/19/016213/the-slashdot-interview-with-lithium-ion-battery-inventor-john-b-goodenough>; 36 pages.

Blöchl, Peter E. "Projector augmented-wave method." Physical review B 50.24 (1994): 17953; 27 pages.

Braga, M. H., et al. "Alternative strategy for a safe rechargeable battery." Energy & Environmental Science 10.1 (2017): 331-336; 6 pages, 2017.

Braga, M. H., et al. "Novel Li 3 ClO based glasses with superionic properties for lithium batteries." Journal of Materials Chemistry A 2.15 (2014): 5470-5480; 11 pages, Jan. 26, 2014.

Braga, M. Helena, et al. "Electric Dipoles and Ionic Conductivity in a Na+ Glass Electrolyte." Journal of the Electrochemical Society 164.2 (2017): A207-A213; 7 pages.

Braga, M. Helena, et al. "Glass-amorphous alkali-ion solid electrolytes and their performance in symmetrical cells." Energy & Environmental Science 9.3 (2016): 948-954; 7 pages, Dec. 24, 2015.

Braga, M. Helena, et al. "The Role of Defects in Li 3 ClO Solid Electrolyte: Calculations and Experiments." MRS Online Proceedings Library Archive 1526 (2013); 5 pages.

Braga, Maria Helena, et al. "Nontraditional, Safe, High Voltage Rechargeable Cells of Long Cycle Life." Journal of the American Chemical Society 140.20 (2018): 6343-6352; 20 pages.

Bruce, P. G., "Electrochemical Publishing" Solid State Electrochemistry, Cambridge University Press, 1994; 1 page.

Chen, Zonghai, et al. "Multi-scale study of thermal stability of lithiated graphite." Energy & Environmental Science 4.10 (2011): 4023-4030; 8 pages.

Choi, Nam-Soon, et al. "Challenges facing lithium batteries and electrical double-layer capacitors." Angewandte Chemie International Edition 51.40 (2012): 9994-10024; 31 pages.

Christensen, M., et al. "H in $\alpha$-Zr and in zirconium hydrides: solubility, effect on dimensional changes, and the role of defects." Journal of Physics: Condensed Matter 27.2 (2014): 025402; 13 pages.

Conway, B.E., Transition from "supercapacitor" to "battery" behavior in electrochemical energy storage. J. Electrochem. Soc. 138, 1539 (1991); 10 pages.

Cunningham, Tesla Model S: The battery pack, Road Show by CNET, 4 pages, Oct. 6, 2010.

Daemen L.L., "Novel anti-perovskite electrolytes for superionic lithium transport" [online], FU11 Annual Progress Report—laboratory directed research and development, Los Alamos National Library, Mar. 2012; 4 pages.

Doeff, Marca M., et al. "Electrochemical insertion of sodium into carbon." Journal of the Electrochemical Society 140.12 (1993): L169-L170; 2 pages.

Ellis, B. L., Nazar, L. F., Sodium and sodium-ion energy storage batteries. Curr. Opin. Solid State Mater. Sci. 16, 168 (2012); 10 pages.

Ghidiu, Michael, et al. "Conductive two-dimensional titanium carbide'clay'with high volumetric capacitance." Nature 516.7529 (2014): 78; 13 pages.

Goodenough, John B. "Changing Outlook for Rechargeable Batteries." (2017): 1132-1135; 4 pages.

Goodenough, John B. et al. "Review-Solid Electrolytes in Rechargable Electrochemical Cells." Journal of The Electrochemical Society (2015); 6 pages.

Goodenough, John B. et al. "Solid Electrolytes in Rechargable Electrochemical Cells." Journal of The Electrochemical Society (2015); 22 pages, Oct. 15, 2015.

Goodenough, John B., and Kyu-Sung Park. "The Li-ion rechargeable battery: a perspective." Journal of the American Chemical Society 135.4 (2013): 1167-1176; 10 pages.

Goodenough, John B., and M. Helena Braga. "Batteries for electric road vehicles." Dalton Transactions 47.3 (2017): 645-648; 4 pages.

H. Mehrer, Diffusion in Solids Fundamentals, Methods, Materials, Diffusion-Controlled Processes, Springer Series in Solid-State Sciences, 1st edn, vol. 155, 2007; 645 pages.

(56) References Cited

OTHER PUBLICATIONS

Hartwig, P. A. Rabenau, and W. Weppner. "Lithium hydroxide halides: phase equilibria and ionic conductivities." Journal of the Less Common Metals 78.2 (1981): 227-233; 7 pages.

Hartwig, P., and W. Weppner. "Ionic conductivities of lithium-halide-based quaternary compounds." Solid State Ionics 3 (1981): 249-254; 6 pages.

Hayashi, Akitoshi, et al. "Characterization of Li 2 S—SiS 2—Li x MO y (M=Si, P, Ge) amorphous solid electrolytes prepared by melt-quenching and mechanical milling." Solid State Ionics 148.3 (2002): 381-389; 9 pages.

Hayashi, Akitoshi, et al. "Rechargeable lithium batteries, using sulfur-based cathode materials and Li2S—P2S5 glass-ceramic electrolytes." Electrochimica Acta 50.2-3 (2004): 893-897; 5 pages.

Hebb, Malcolm H. "Electrical conductivity of silver sulfide." The journal of chemical physics 20.1 (1952): 185-190; 6 pages.

Heimann, B., Classic and Advanced Ceramics: From Fundamentals to Applications. John Wiley & Sons, Apr. 16, 2010; 576 pages.

Heyd, Jochen, Gustavo E. Scuseria, and Matthias Ernzerhof. "Hybrid functionals based on a screened Coulomb potential." The Journal of Chemical Physics 118.18 (2003): 8207-8215; 9 pages.

Hong, S. Y., Kim, Y., Park, Y., Choi, A., Choic, N.-S., Lee, K. T., Charge carriers in rechargeable batteries: Na ions vs. Li ions, Energy Environ. Sci. 6, 2067 (2013); 15 pages.

Hönnerscheid, Andreas, et al. "Die Kristallstrukturen der Hydroxyhalogenide Li4 (OH) 3Br und Li4 (OH) 3I." Zeitschrift für anorganische und allgemeine Chemie 629.2 (2003): 317-320; 4 pages.

Hsu, Jeremy. "Texas Town Installs a Monster Battery for Backup Power." Popular Science, Apr. 5, 2010, www.popsci.com/technology/article/2010-04/texas-town-turns-monster-battery-backup-power.

Inaguma, Yoshiyuki et al. "High ionic conductivity in lithium lanthanum titanate." Solid State Communications 86.10 (1993): 689-693; 5 pages.

International Preliminary Report on Patentability for PCT Patent Application No. PCT/IB2016/051451, dated Sep. 21, 2017; 7 pages.

International Preliminary Report on Patentability for PCT Patent Application No. PCT/IB2016/051776, dated Oct. 3, 2017; 8 pages.

International Search Report and Written Opinion received for PCT Patent Application No. PCT/US2016/036661, dated Nov. 30, 2016; 20 pages.

International Search Report and Written Opinion received for PCT Patent Application No. PCT/US2017/041348, dated Aug. 17, 2017; 15 pages.

International Search Report and Written Opinion received for PCT Patent Application No. PCT/US2017/041382, dated Aug. 25, 2017; 12 pages.

ISO 11357-2: Plastics—Differential Scanning Calorimetry (DSC)—Part 2: Determination of glass transition temperature, 1999; 12 pages.

J.P. Hansen and I. R. McDonald, "Dynamics of Supercooled Liquids." Theory of Simple Liquids, Elsevier, 2006, 250-254; 10 pages.

Jayaprakash, N., Shen, J., Moganty, S. S., Corona, A., Archer, L. A. Porous Hollow Carbon@Sulfur Composites for High-Power Lithium-Sulfur Batteries. Angew. Chem. Int. Ed. 50, 5904 (2011); 5 pages.

Jennings, James Robert, Qizhao Huang, and Qing Wang. "Kinetics of Li x FePO4 Lithiation/Delithiation by Ferrocene-Based Redox Mediators: An Electrochemical Approach." The Journal of Physical Chemisny C 119.31 (2015): 17522-17528; 7 pages.

Ji, L. et al. Graphene Oxide as a Sulfur Immobilizer in High Performance Lithium/Sulfur Cells, JACS, 133, 18522 (2011); 4 pages.

Jung, H. Y., Karimi, M. B., Hahm, M. G., Ajayan, P. M., Jung, Y. J., Transparent, flexible supercapacitors from nano-engineered carbon films. Sci. Rep. 2, 773 (2012); 5 pages.

Kamaya, Noriaki, et al. "A lithium superionic conductor." Nature materials 10.9 (2011): 682; 5 pages.

Koenig, A. A., Rasmussen, J. R. Development of a high specific power sodium sulfur cell. Proceedings of the 34th International Power Sources Symposium, p. 30. doi:10.1109/IPSS.1990.145783, 1990; 4 pages.

Kondo, S., K. Takada, and Y. Yamamura. "New lithium ion conductors based on Li2S—SiS2 system." Solid State Ionics 53 (1992): 1183-1186; 4 pages.

Kresse, Georg, and Jürgen Furthmüller. "Efficient iterative schemes for ab initio total-energy calculations using a plane-wave basis set." Physical review B 54.16 (1996): 11169; 18 pages.

Lapp, Torben, Steen Skaarup, and Alan Hooper. "Ionic conductivity of pure and doped Li3N." Solid State Ionics 11.2 (1983): 97-103; 7 pages.

Li, H. B. et al. Amorphous nickel hydroxide nanospheres with ultrahigh capacitance and energy density as electrochemical pseudocapacitor materials. Nature Commun 4, 1894 (2013); 8 pages.

Liu, D., et al. "Spinel materials for high-voltage cathodes in Li-ion batteries." Rsc Advances 4.1 (2014): 154-167; 14 pages.

Liu, Duay, J., Lane, T., Lee, S. B. Synthesis and characterization of RuO2/poly(3,4-ethylenedioxythiophene) composite nanotubes for supercapacitors. Phys. Chem. Chem. Phys. 12, 4309 (2010); 8 pages.

Liu, Zengcai, et al. "Anomalous high ionic conductivity of nanoporous β-Li3PS4." Journal of the American Chemical Society 135.3 (2013): 975-978; 4 pages.

Lu, S., Chen, Y., Wu, X., Wang, Z., Yang Li, Y. Three-Dimensional Sulfur/Graphene Multifunctional Hybrid Sponges for Lithium-Sulfur Batteries with Large Areal Mass Loading. Sci. Rep. 4, 4629 (2014); 4 pages.

Ma, G., A lithium anode protection guided highly-stable lithium-sulfur battery. Chem. Commun 50, 14209 (2014); 4 pages.

Manthiram, Arumugam, et al. "Rechargeable lithium-sulfur batteries." Chemical reviews 114.23 (2014): 11751-11787; 37 pages.

Mo, Yifei, Shyue Ping Ong, and Gerbrand Ceder. "First principles study of the Li10GeP2S12 lithium super ionic conductor material." Chemistry of Materials 24.1 (2012): 15-17; 3 pages.

Nagao, M., Hayashi, A., Tatsumisago, M. Fabrication of favorable interface between sulfide solid electrolyte and Li metal electrode for bulk-type solid-state Li/S battery, Electrochem. Commun 22, 177 (2012); 4 pages.

Ohara Inc., ">1)LICGC™AG-01." Ohara Inc. : Lithium-Ion Conducting Glass-Ceramics (LICGC) :Development Products, www.ohara-inc.co.jp/en/product/electronics/licgc.html; 2 pages, 2017.

Ong, S. P., Chevrier, V. L, Hautier, G., Jain, A., Moore, C, Kim, S., Ma, X. H., Ceder, G., "Voltage, Stability and Diffusion Barrier Differences Between Sodium-ion and Lithium-ion Intercalation Materials". Energy Environ. Sci., 4, 3680 (2011); 9 pages.

Palomares, Verónica, et al. "Na-ion batteries, recent advances and present challenges to become low cost energy storage systems." Energy & Environmental Science 5.3 (2012): 5884-5901; 18 pages.

Parlinski, K., Z. Q. Li, and Y. Kawazoe. "First-principles determination of the soft mode in cubic ZrO 2." Physical Review Letters 78.21 (1997): 4063; 4 pages.

PCT Patent Application No. PCT/US2017/041348 filed Jul. 10, 2017 by John B. Goodenough, et al; 22 pages.

Perdew, John P., and Yue Wang. "Accurate and simple analytic representation of the electron-gas correlation energy." Physical Review B 45.23 (1992): 13244; 6 pages.

Sakka, S., and J. D. Mackenzie. "Relation between apparent glass transition temperature and liquids temperature for inorganic glasses." Journal of Non-Crystalline Solids 6.2 (1971): 145-162; 12 pages.

Schwering, Georg, et al. "High Lithium Ionic Conductivity in the Lithium Halide Hydrates Li3-n (OHn) Cl (0.83≤n≤2) and Li3-n (OHn) Br (1≤ n≤2) at Ambient Temperatures." ChemPhysChem 4.4 (2003): 343-348; 6 pages.

Shannon, Robert D. "Revised effective ionic radii and systematic studies of interatomic distances in halides and chalcogenides." Acta crystallographica section A: crystal physics, diffraction, theoretical and general crystallography 32.5 (1976): 751-767; 17 pages.

Song, H. K., Lee, K. T., Kim, M. G., Nazar, L. F., Cho, J., Recent progress in nanostructured cathode materials for lithium secondary batteries. Adv. Fund. Mater. 20, 3818 (2010); 17 pages.

(56) References Cited

OTHER PUBLICATIONS

Song, J. Y., Y. Y. Wang, and C. C. Wan. "Conductivity study of porous plasticized polymer electrolytes based on poly (vinylidene fluoride) a comparison with polypropylene separators." Journal of The Electrochemical Society 147.9 (2000): 3219-3225; 7 pages.
Song, W., Cao, X., Wu, Z., Chen, J., Huangfu, K., Wang, X., Huang, Y., Ji, X. A study into the extracted ion number for NASCION structured $Na_3V_2(PO_4)_3$ in sodium-ion batteries Phys. Chem. Chem. Phys. 16, 17681 (2014); 7 pages.
Stahlkopf, Karl (Jun. 2006). Taking Wind Mainstream. IEEE Spectrum, retrieved Mar. 21, 2015; 4 pages.
Stevens, D. A., Dahn J. R. High capacity anode materials for rechargeable sodium-ion batteries. J. Electrochem. Soc. 147, 1271 (2000); 3 pages.
Takada, Kazunori, Noboru Aotani, and Shigeo Kondo. "Electrochemical behaviors of Li+ion conductor, Li 3 PO 4—Li 2 S—SiS 2." Journal of power sources 43.1 (1993): 135-141; 7 pages.
Tarascon, J.-M., Armand, M., Issues and challenges facing rechargeable lithium batteries. Nature 414, 359 (2001); 9 pages.
Tatsumisago, Masahiro, and Akitoshi Hayashi. "Superionic glasses and glass-ceramics in the Li 2 S—P 2 S 5 system for all-solid-state lithium secondary batteries." Solid State Ionics 225 (2012): 342-345; 4 pages.
U.S. Appl. No. 15/700,414, filed Sep. 11, 2017 by Maria Helena Sousa Soares de Oliveira Braga, et al.
U.S. Appl. No. 15/645,643, filed Jul. 10, 2017 by John B. Goodenough, et al.
Vlad, A. et al. Hybrid supercapacitor-battery materials for fast electrochemical charge storage. Sci. Rep. 4, 4315 (2014); 7 pages.
Walawalkar, R., Apt, J., Mancini, R. (2007). Economics of electric energy storage for energy arbitrage and regulation in New York. Energy Policy 35(4), 2558 (2007); 11 pages.
Wang, Yonggang, et al. "Structural manipulation approaches towards enhanced sodium ionic conductivity in Na-rich antiperovskites." Journal of Power Sources 293, Jun. 10, 2015 (Jun. 10, 2015), pp. 735-740, XP055279752, CH ISSN: 0378-7753, DOI: 10.1016/j.jpowsour.2015.06.002 abstract; 6 pages.
Wimmer, Erich, et al. "Temperature-dependent diffusion coefficients from ab initio computations: Hydrogen, deuterium, and tritium in nickel." Physical Review B 77.13 (2008): 134305; 12 pages.
Xie, J. et al. Preparation of three-dimensional hybrid nanostructure-encapsulated sulfur cathode for high-rate lithium sulfur batteries. J. Power Sources, 253, 55 (2014); 9 pages.
Yabuuchi, N ., Kubota, K., Dahbi, M., Komaba, S., Research Development on Sodium-Ion Batteries. Chem. Rev. 114, 11636 (2014); 47 pages.
Yao, H. et al. Improved lithium-sulfur batteries with a conductive coating on the separator to prevent the accumulation of inactive S-related species at the cathode-separator interface. Energy Environ. Sci. 7, 3381 (2014); 10 pages.
Zhang, S. et al. Control of graphitization degree and defects of carbon blacks through ball-milling. RSC Adv. 4, 505 (2014); 5 pages.
Zhang, S. S. Liquid electrolyte lithium/sulfur battery: Fundamental chemistry, problems, and solutions. Power Sources, 231, 153 (2013); 10 pages.
Zhang, Yi, Yusheng Zhao, and Changfeng Chen. "Ab initio study of the stabilities of and mechanism of superionic transport in lithium-rich antiperovskites." Physical Review B 87.13 (2013): 134303; 8 pages.
Zhao, Yusheng, and Luke L. Daemen. "Superionic conductivity in lithium-rich anti-perovskites." Journal of the American Chemical Society 134.36 (2012): 15042-15047; 6 pages.
Zheng, S. et al. J. High Performance C/S Composite Cathodes with Conventional Carbonate-Based Electrolytes in Li-S Battery. Sci. Rep. 4, 4842 (2014); 7 pages.
PCT International Preliminary Report for International application No. PCT/US2018/055342 dated Apr. 23, 2020, 9 pages.

\* cited by examiner

HEAT ENERGY-POWERED ELECTROCHEMICAL CELLS

CROSS REFERENCE TO RELATED APPLICATION

This application is a continuation of U.S. patent application Ser. No. 16/691,344 filed Nov. 21, 2019, which is a continuation of U.S. patent application Ser. No. 15/782,443 filed Oct. 12, 2017, now U.S. Pat. No. 10,490,360 issued Nov. 26, 2019.

TECHNICAL FIELD

The present disclosure relates to electrochemical cells containing a solid metal polymer/glass electrolyte that are powered by heat energy.

BACKGROUND

An electrochemical cell has two electrodes, the anode and the cathode, separated by an electrolyte. In a traditional electrochemical cell, materials in these electrodes are both electronically and chemically active. The anode is a chemical reductant and the cathode is a chemical oxidant. Both the anode and the cathode are able to gain and lose ions, typically the same ion, which is referred to as the working cation of the battery. The electrolyte is a conductor of the working cation, but normally it is not able to gain and lose ions. The electrolyte is an electronic insulator, it does not allow the movement of electrons within the battery. In a traditional electrochemical cell, both or at least one of the anode and the cathode contain the working cation prior to cycling of the electrochemical cell.

The electrochemical cell operates via a reaction between the two electrodes that has an electronic and an ionic component. The electrolyte conducts the working cation inside the cell and forces electrons also involved in the reaction to pass through an external circuit.

A battery may be a simple electrochemical cell, or it may be a combination of multiple electrochemical cells.

Rechargeable electrochemical cells and rechargeable batteries containing such electrochemical cells are typically charged using electrical energy from an external power source.

SUMMARY

The present disclosure provides a heat energy-powered electrochemical cell including an anode, a cathode, and a solid metal polymer/glass electrolyte. The solid metal polymer/glass electrolyte includes between 1% and 50% metal polymer by weight as compared to total solid metal polymer/glass electrolyte weight and between 50% and 90% solid glass electrolyte by weight as compared to the total solid metal polymer/glass electrolyte weight. The solid glass electrolyte includes a working cation and an electric dipole.

The following additional features may be combined with the heat energy-powered electrochemical cell above, with any other features in the specification, and with one another in any combinations unless clearly mutually exclusive:

i) the heat energy-powered electrochemical cell may delivers, at a given temperature or within a given temperature range, at least 85% as much electric power ($P_{dis}$) as an electrochemical cell having the same anode, the same cathode, and the solid glass electrolyte but lacking the metal polymer;

ii) the heat energy-powered electrochemical cell may deliver, at a given temperature or within a given temperature range, at least 125% as much electric power ($P_{dis}$) as an electrochemical cell having the same anode, the same cathode, and the solid glass electrolyte but lacking the metal polymer;

iii) the heat energy-powered electrochemical cell may have a Young's modulus of less than 120 GPa/mm$^2$;

iv) the solid metal polymer/glass electrolyte may have a Young's modulus of less than 120 GPa/mm$^2$;

v) the heat energy-powered electrochemical cell may have a surface area of a largest external surface of at least 1 m$^2$;

vi) the solid metal polymer/glass electrolyte may have an ionic conductivity that is at least 25% of the ionic conductivity of the solid glass electrolyte at 25° C.;

vii) the anode may include a metal foil;

viii) the anode may include carbon;

ix) the metal polymer may include a metal polyacrylate;

x) the metal polyacrylate may include sodium polyacrylate;

xi) the metal polymer may include a metal polyethylene glycol;

xii) the metal in the metal polymer may include sodium (Na), lithium (Li), or aluminum (Al);

xiii) the solid metal polymer/glass electrolyte may adhere to the cathode, the anode, or both;

xiv) the working cation may include lithium ion (Li$^+$), sodium ion (Na$^+$), potassium ion (K$^+$) magnesium ion (Mg$^{2+}$), copper ion (Cu$^+$) or aluminum ion (Al$^{3+}$);

xv) the dipole may have the general formula $A_yX_z$ or the general formula $A_{y-1}X_z^{-q}$, wherein A is Li, Na, K, Mg, and/or Al, X is S and/or O, 0<z≤3, y is sufficient to ensure charge neutrality of dipoles of the general formula $A_yX_z$, or a charge of −q of dipoles of the general formula $A_{y-1}X_z^{-q}$, and 1≤q≤3;

xvi) the dipole may include up to 50 wt % of the solid glass electrolyte weight of a dipole additive;

xvii) the dipole additive may include one or a combination of compounds having the general formula $A_yX_z$ or the general formula $A_{y-1}X_z^{-q}$, wherein A is Li, Na, K, Mg, and/or Al, X is S, O, Si, and/or OH, 0<z≤3, y is sufficient to ensure charge neutrality of dipole additives of the general formula $A_yX_z$, or a charge of −q of dipole additives of the general formula $A_{y-1}X_z^{-q}$, and 1≤q≤3;

xviii) the cathode may include a metal foil;

xix) the cathode may include carbon;

xx) the cathode may include a metal foam;

xxi) the cathode may include a metal oxide.

xxii) the heat energy-powered electrochemical cell may be powered by solar heat;

xxiii) the heat energy-powered electrochemical cell may be powered by body heat;

xxiv) the heat energy-powered electrochemical cell may be powered by waste heat;

The present disclosure further includes a heat energy-powered battery system including any heat energy-powered electrochemical cell above or otherwise herein.

The present disclosure also includes a heat energy-powered battery system including any heat energy-powered electrochemical cell above or otherwise herein and a rechargeable battery or fuel cell electrically connected to the heat energy-powered electrochemical cell.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present invention and its features and advantages, reference is now made to the following description, taken in conjunction with the accompanying drawings.

DETAILED DESCRIPTION

The present disclosure relates to heat energy-powered electrochemical cells and heat energy-powered batteries, as well as various devices containing such heat energy-powered electrochemical cells and heat energy-powered batteries and ways to use such electrochemical cells and batteries. These heat energy-powered devices may convert heat energy into direct-current electric power.

Figure 1:
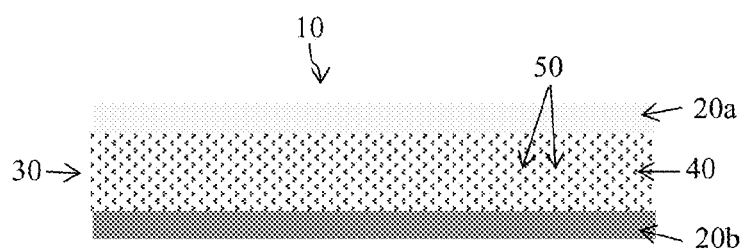
FIG. 1 is a schematic, cross-sectional diagram of a heat energy-powered electrochemical cell according to the present disclosure.

A heat energy-powered electrochemical cell 10 such as depicted in FIG. 1, contains two electrodes 20, a cathode 20a and an anode 20b, with a solid metal polymer/glass electrolyte 30 as described herein between them. Electrodes 20 may be large-area electrodes. Solid metal polymer/glass electrolyte 30 includes a solid glass electrolyte 40, depicted as the dipoles it contains, and a metal polymer 50. The heat energy-powered electrochemical cell uses a working cation, which may be an alkali-metal cation, such as $Li^{3o}$, $Na^+$, $K^+$, or a metal cation, such as $Mg^{2+}$, $Cu^{3o}$, and/or $Al^{3+}$. The heat energy-powered electrochemical cell may be an all solid-state electrochemical cell.

A battery, such as a heat energy-powered battery of the present disclosure, contains an electrochemical cell with at least additional component, such as another electrochemical cell, a casing, electrical contacts, control equipment, such as a computer or processor, or a meter or sensor, or safety equipment, such as a cut-off switch or fire suppression equipment. A battery may, therefore, be as simple as a coin cell, jelly roll, or prismatic cell, or as complex as an automobile or other vehicle battery or a large grid, home, or industrial storage battery. A heat energy-powered battery of the present disclosure may be an all solid-state battery.

Heat energy-powered electrochemical cells are described more particularly below, but the disclosure is equally applicable to heat energy-powered batteries containing such heat energy-powered electrochemical cells.

Heat-Energy Powering and Self-Charge/Self-Cyclizing

Heat energy-powered electrochemical cells of the present disclosure exhibit self-charge and self-cycling behaviors as well. Self-charge is a charging reaction in an electrochemical cell in the absence of an applied charging electric power ($P_{ch}$) at open circuit. The chemical reaction of an electrochemical cell includes an ionic component, typically involving the working cation, and an electronic component, involving electron transfer. Self-charging occurs where the ionic component of the chemical reaction of the electrochemical cell is between the anode and the electrolyte rather than between the two electrodes, as in traditional electrochemical cells, but the electronic component remains between the two electrodes, as in traditional electrochemical cells. The self-charge and an associated self-cycling phenomenon occur where the electrolyte contains not only a working cation with a high ionic conductivity, but also electric dipoles with a slower translational mobility.

At open circuit, no electronic current flows, and the open-circuit voltage $V_{oc}$ of a electrochemical cell is the difference in the chemical energies (Fermi levels) of the two electrodes (which may simply be current collectors) divided by the magnitude, e, of the electron charge. The driving force for a chemical reaction in an electrochemical cell at open circuit is the requirement that the chemical energies of two materials in contact with one another at a heterojunction interface be equalized; the chemical reaction creates an electric double-layer capacitor (EDLC) across heterojunction interfaces by the motion and/or creation of charged particles across or on either side of the interface. The EDLC at the electrode/electrolyte interface in a traditional electrochemical cell is created at open-circuit by the motion of positively charged working cations in the electrolyte toward the anode and away from the cathode, with the creation of mirror electronic charges in the electrodes, which are typically metallic.

In self-charging and self-cycling electrochemical cells, there are two different types of positive charges in the electrolyte, fast-moving working cations and much slower-moving electric dipoles. As a result, the fast-moving cations can create the needed EDLC to equilibrate the Fermi energies of the materials either side of an electrode/electrolyte interface junction. However, on the later arrival of the slower-moving electric dipoles that move in the electric field created across the electrolyte by the cation redistribution, an overcharge across the EDLC can be adjusted by plating the working cations across the interface onto the anode to give a self-charge current. At closed-circuit, a self-charge current may add to or subtract from a discharge or charging current.

Self cycling occurs where the working cation of the electrolyte is plated on an electrode, which charges the electrolyte negative. The negative charge in the electrolyte, when large enough, strips the plated metal back to the electrolyte as cations and releases electrons to the external circuit. The different rates of response of the dipoles and ions in the electrolyte and the electrons to the external circuit result in a cycling of the currents in the external circuit and/or the cell voltage.

Although both self-charging and self-cycling behaviors may occur without an external energy input, both phenomena may also occur as a component of the cell charge/discharge performance with an external charge/discharge input. For example, a self-charging electrochemical cell may be provided with a charging current as an external energy input, in which case it will exhibit a greater charge than is dictated by the charging current to give a coulomb efficiency greater than 100%. As another example, the discharge current and/or voltage may have a self-cycling component of frequency that is different from the charge/discharge cycling frequency.

On discharge, an electrochemical cell or a battery delivers electric power ($P_{dis}$) that is the product of the discharge current ($I_{dis}$) and the discharge voltage ($V_{dis}$) ($P_{dis}=I_{dis}V_{dis}$). In a battery containing multiple electrochemical cells, the cells may be connected in series to obtain a particular battery discharge voltage ($V_{dis}$) and in parallel to provide a particular battery discharge current ($I_{dis}$).

The discharge current ($I_{dis}$) of an electrochemical cell depends on the mobility of the working cation and how readily it may be plated from the electrolyte to the electrode or stripped from the electrode into the electrolyte. Both of these properties are influenced by temperature. Accordingly, the discharge current ($I_{dis}$) and ultimately the electric power ($P_{dis}$) delivered by any electrochemical cell depends somewhat on temperature. However, in a heat energy-powered electrochemical cell of the present disclosure, the dipoles in the polymer/glass electrolyte have a high dielectric constant, leading to a much greater influence of temperature on electric power ($P_{dis}$) than in traditional electrochemical cells.

A heat energy-powered electrochemical cell or a heat energy-powered battery of the present disclosure may deliver, at a given temperature or within a given temperature range, at least 85%, at least 90%, at least 95%, at least 100%, at least 125%, or at least 150% as much electric power ($P_{dis}$) as a comparable electrochemical cell containing only the solid glass electrolyte component of the solid/polymer glass electrolyte disclosed herein.

Flexibility

A heat energy-powered electrochemical cell of the present disclosure may also be flexible. For example, it may have a Young's modulus of less than 120 $GPa/mm^2$, less than 70 $GPa/mm^2$, less than 50 $GPa/mm^2$, less than 20 $GPa/mm^2$, less than 10 $GPa/mm^2$, or less than 5 $GPa/mm^2$.

A heat energy-powered electrochemical cell of the present disclosure may contain a solid metal polymer/glass electrolyte with a Young's modulus of less than any of the above limits. Such a solid metal polymer/glass electrolyte may, therefore, have a Young's modulus at least 10% lower, at least 25% lower, at least 50% lower, at least 75% lower, or at least 90% lower than the Young's modulus of an otherwise chemically identical solid glass electrolyte lacking a metal polymer.

A heat energy-powered electrochemical cell of the present disclosure may be able to have a large surface area, measured in the external surface area of either electrode. For example, the surface area may be at least 0.05 $m^2$, 0.1 $m^2$, 0.5 $m^2$, 1 $m^2$, at least 3 $m^2$, or at least 6 $m^2$.

The solid metal polymer/glass electrolyte may also be formed into sheets having a surface area of at least 0.05 $m^2$, 0.1 $m^2$, 0.5 $m^2$, 1 $m^2$, at least 3 $m^2$, or at least 6 $m^2$, which may allow its use in large rolls of electrochemical cells, and as a separator membrane in flow-through electrochemical cells. The solid metal polymer/glass electrolyte may be have a thickness of less than 5 mm, less than 1 mm, or less than 0.5 mm, even when formed with the surface areas described above.

Water Insensitivity

The metal polymer in the heat energy-powered electrochemical cells of the present disclosure may make them less sensitive to water than electrochemical cells lacking the metal polymer. This may be particularly true when the metal polymer includes a metal acrylate, such as sodium acrylate. This property may allow heat energy-powered electrochemical cells of the present disclosure to be exposed to air for short durations of time. For example, a roll of heat energy-powered electrochemical cell material may be removed from a sealed container, cut into pieces of suitable sizes while exposed to ambient air, then placed into a battery. This may particularly facilitate installation of the heat energy-powered electrochemical cell material in larger structures, such as buildings and industrial installations. It may also decrease manufacturing costs for heat energy-powered batteries as compared to batteries containing more water-sensitive materials. In addition, the ease with which heat energy-powered electrochemical cells of the present disclosure can be handles facilitates adaptive battery configurations as well. For example, if more voltage is needed and capacity can be reduced, a sheet of the heat energy-powered electrochemical cell may simply be cut in half and assembled as two separate cells in series, doubling the voltage and halving the capacity of the resulting battery.

Solid Polymer/Glass Electrolyte

The solid metal polymer/glass electrolyte is referred to as glass because it is amorphous, as may be confirmed through X-ray diffraction. In particular, the solid metal polymer/glass electrolyte may contain less than 2% crystalline material, that is not detectable by X-ray diffraction, or no detectable crystalline material, as detected using X-ray diffraction.

The solid metal polymer/glass electrolyte may be non-flammable and is capable of plating dendrite-free alkali metals on an electrode current collector and/or on itself; the atoms of the plated metal come from the working cation of the electrolyte; the plated working cations may or may not be resupplied to the electrolyte from the other electrode.

Where the solid metal polymer/glass electrolyte is neither reduced by the anode nor oxidized by a high-voltage cathode, including a high-voltage storage of electrostatic energy, there is no solid-electrolyte interphase (SEI) formed at an electrode/electrolyte interface, and the electrochemical cell can have a long cycle life, such as over 10,000 cycles.

In particular, the solid metal polymer/glass electrolyte may be an $A^+$-glass electrolyte containing as the working cation an alkali-metal cation, such as $Li^+$, $Na^+$, $K^+$ or a metal cation, such as $Mg^{2+}$, $Cu^+$, or $Al^{3+}$ as well as electric dipoles such as $A_2X$ or $AX^-$, or $MgX$ or $Al_2X_3$ where A=Li, Na, or K and X=O or S or another element or dipole molecule. Suitable $A^+$-glass electrolytes and methods of making them have been previously described in WO2015/128834 (A Solid Electrolyte Glass for Lithium or Sodium Ion Conduction) and in WO2016/205064 (Water-Solvated Glass/Amorphous Solid Ionic Conductors), where the alkali-metal-ion disclosures of both are incorporated by references therein.

In general, the metal working cation in the solid metal polymer/glass electrolyte used in the heat energy-powered electrochemical cells of this disclosure may be an alkali-metal ion, such as $Li^+$, $Na^+$, $K^+$, or $Mg^{2+}$ or $Al^{3+}$; some of these mobile working cations may also be attached to an anion to form a less mobile electric dipole such as $A_2X$, $AX^-$, or condensates of these into larger ferroelectric molecules in which A=Li, Na, K, Mg, Al and x=O, S, or another anion atom. The solid metal polymer/glass electrolyte may also contain as additives up to 50 w % of other electric-dipole molecules than those formed form the precursors used in the glass synthesis without dipole additives. The presence of the electric dipoles gives the glass a high dielectric constant; the dipoles are also active in promoting the self-charge and self-cycling phenomenon. In addition, the solid metal polymer/glass electrolyte are not reduced on contact with metallic lithium, sodium, or potassium and they are not oxidized on contact with high-voltage cathodes such as the spinel $Li[Ni_{0.5}Mn_{1.5}]O_4$ or the olivines $LiCo(PO_4)$ and $LiNi(PO_4)$. Therefore, there is no formation of a passivating solid-electrolyte interphase (SEI). Also, the surfaces of the solid-glass electrolytes are wet by an alkali metal, which allows plating from the glass electrolyte dendrite-free alkali metals that provide a low resistance to transfer of ions across an electrode/electrolyte interface over at least a thousand, at least two thousand, or at least five thousand charge/discharge cycles.

The solid metal polymer/glass electrolyte may be applied as a slurry over a large surface area; the slurry may also be incorporated into paper, such as carbon paper, or other flexible cellulose or polymer membranes or onto carbon felt or a metal-foam electrode; on drying, the slurry forms a continuous solid metal polymer/glass electrolyte. The membrane framework may have attached electric dipoles or, on contact with the glass, forms electric dipoles that have only rotational mobility. The electric dipoles within the glass may have translational as well as rotational mobility at 25° C. Reactions between the dipoles with translational mobility may form dipole-rich regions within the glass electrolyte with some dipole condensation into ferroelectric molecules; the coalescence of the dipoles, which is referred to as aging of the electrolyte, may take days at 25° C., but can be accomplished in minutes at 100° C.

One or more of the dipoles may have some mobility even at 25° C.

The solid metal polymer/glass electrolyte may have a large dielectric constant, such as a relative permittivity ($\sigma_R$) of $10^2$ or higher. Solid metal polymer/glass electrolytes are non-flammable and may have an ionic conductivity $\sigma_A$ for the working cation $A^+$, of at least $10^{-2}$ S/cm at 25° C. This conductivity is comparable to the ionic conductivity of the flammable conventional organic-liquid electrolytes used in Li-ion batteries, which makes the cells safe.

The solid metal polymer/glass electrolyte contains both fast-moving ions and slower moving and/or slower-rotating electric dipoles whereas a conventional electrolyte contains only fast-moving ions. The different timing of the fast-moving and slow-moving charges to an anode/electrolyte interface to form an electric-double-layer capacitor (EDLC) and the requirement that the EDLC at the interface retain equal Fermi levels (electrochemical potentials) at the interface results in a plating of some fast-moving solid metal polymer/glass electrolyte cations on the anode. This process, which does not require replenishment of the mobile cations from the cathode, represents a self-charge as a result of an anode-electrolyte chemical reaction; the electronic component of the reaction is, nevertheless, between the two electrodes.

The fast moving ions in the solid metal polymer/glass electrolyte are typically the working cations. The phenomenon of self-charge occurs where a solid metal polymer/glass electrolyte contains both fast-moving cations and slower-moving charges of electric dipoles. At closed-circuit, the self-charging results in an output power $P_{dis}=I_{dis}V_{dis}$ that can last for months before an external charge $P_{ch}$ is required. The process of self-charge and delivery of a $P_{dis}$ is driven by heat energy, and $P_{dis}$ may increase dramatically with the temperature of a cell as it traverses the glass-transition temperature.

The solid metal polymer/glass electrolyte may be formed by transforming a crystalline electronic insulator containing the working cation or its constituent precursors (typically containing the working cation bonded to O, OH, and/or a halide) into a working-ion-conducting glass/amorphous solid. This process can take place in the presence of dipole additives as well. The working cation-containing crystalline, electronic insulator or its constituent precursors may be a material with the general formula $A_{3-x}H_xOX$, wherein $0 \leq x \leq 1$, A is at least one alkali metal, and X is the at least one halide. Water may exit the solid metal polymer/glass electrolyte during its formation, particularly due to heating. Water may be evaporated from the solid metal polymer/glass electrolyte at a higher temperature, such as 230° C. or higher, or between 230° C. and 260° C.

The metal polymer in the solid metal polymer/glass electrolyte may include any metal polymer that can form a composite material with the solid glass electrolyte without reacting with the solid glass electrolyte and without reducing the ionic conductivity, such that the solid metal polymer/glass electrolyte has an ionic conductivity that is at least 25%, at least 50%, at least 75%, or at least 90% of the ionic conductivity of the solid glass electrolyte without metal polymer at 25° C.; or without reducing the ionic conductivity of the solid metal polymer/glass electrolyte to less than $10^{-2}$ S/cm at 25° C. Some polymers may actually improve ionic conductivity, for example by increasing ionic conductivity of the solid metal polymer/glass electrolyte by at least 5%, at least 10%, at least 25%, or at least 50% as compared to the solid glass electrolyte with the metal polymer at 25° C.

The metal polymer may bond to the solid glass electrolyte without reducing or oxidizing the solid glass electrolyte and without hindering the mobility of the mobile charges within the glass. The metal polymer may not only render the solid metal polymer/glass electrolyte mechanically robust and flexible and enhance bonding with the electrodes or electrode current collectors, but it may also make the also render the solid metal polymer/glass electrolyte stable during high-voltage charge and on contact with alkali-metal anodes undergoing a charging voltage.

The metal polymer may contain one or more types of metal, such as sodium (Na), lithium (Li), or aluminum (Al). The polymer may be a copolymer. The metal polymer may be produced by gel polymerization, or by other methods such as solution or suspension polymerization. The polymer may be an organic polymer, in particular a polyacrylate, such as sodium polyacrylate, or a polyethylene glycol.

The metal polymer may be present in an amount of 1% to 50% by polymer weight/solid metal polymer/glass electrolyte weight.

The metal polymer present in the solid metal polymer/glass electrolyte of the present disclosure may also adhere the solid metal polymer/glass electrolyte to one or both electrodes in the heat energy-powered electrochemical cell. This may make the cell less likely to fail or experience a performance decrease when subjected to mechanical stress that tends to separate the electrolyte and electrode(s). In addition, one or both electrodes or other battery in general may lack binders, such as polyvinylidene fluoride (PVDF) and N-methyl-2-pyrolidine (NMP), often used to adhere the electrode(s) to the electrolyte.

In addition, in a solid metal polymer/glass electrolyte in the heat energy-powered electrochemical cell of the present disclosure may allow the working cation to plate dendrite-free on the anode.

Electrodes

An electrode used in a heat energy-powered electrochemical cell of the present disclosure may include a current collector and/or an active redox material. An electrode current collector may include a metal, such as aluminum (Al) or copper (Cu); it may also include a form of carbon, an alloy, or a compound such as titanium nitride (TiN) or a transition-metal oxide. The current collector may be an electrode without an active material on it or it may transport electrons to/from an active material on it; the active material may be an alkali metal, an alloy of the alkali metal, or a compound containing an atom of the working cation of the electrolyte. The current collector transports electrons to or from the external circuit and to or from my active material of an electrode reacts with the working cation of the electrolyte by having electronic contact with the current collector and ionic contact with the electrolyte. The ionic contact with the electrolyte may involve only excess or deficient working-ion concentration at the electrode/electrolyte interface, which creates an electric-double-layer capacitor (EDLC), or it may also involve formation of a chemical phase at the electrode surface. In a heat energy-powered electrochemical cell of the present disclosure, any chemical formation on an electrode surface as well as the EDLC across the electrode/electrolyte interface is reversible.

According to the present invention, one or both electrodes in the electrochemical cell may be, on fabrication, only current collectors containing no detectable atom of the working cation of the electrolyte down to 7000 ppm by, for example, atomic absorption spectroscopy. However, after cell assembly, atoms of the working cation of the electrolyte may be detected on the electrode by atomic absorption spectroscopy or by other means.

In addition, one or both electrodes of the cell may contain an additional electronically conductive material such as carbon that aids plating of the working cation on the current collector without changing significantly the effective Fermi level of the composite current collector.

The cathode may also contain a high-voltage active material, such as the spinel $Li[Ni_{0.5}Mn_{1.5}]O_4$ or an olivine, such as $LiFe(PO_4)$, $LiCo(PO_4)$ and $LiNi(PO_4)$, or another metal oxide. When brittle materials are used in the cathode or anode, the cathode or anode may contain these brittle materials as particles located in other agents, such as polymers or metal foams, that make the more flexible than sheets or larger structures of the brittle materials could tolerate. This allows the use of brittle electrode active materials in flexible heat energy-powered electrochemical cells.

In particular, heat energy-powered electrochemical cells of the present disclosure may contain an aluminum (Al) anode and a copper (Cu) cathode. These metals may be present as metal only, or coated with a carbon film. In some examples, particularly for sodium-ion batteries, a more complex cathode, such as a metal oxide (particularly $MnO_2$)/carbon/metal foam cathode may be used. Cu foam or other metal foam electrodes as well as electrodes containing carbon felt or carbon cloth may also be used.

The cathode may also be contacted by a particle such as $S_8$, $MnO_2$, $FePO_4$, or a molecule such as ferrocene.

Other electronic conductors that may be used as electrodes or in electrodes include nickel (Ni), zinc (Zn), lead (Pb), tin (Sn), iron (Fe), or a conductive compound such as TiN or $Fe_3O_4$.

In some examples, the cathode may be a flow-through cathode, which may be combined with an alkali-metal anode.

Applications and Uses

Heat energy-powered batteries of the present disclosure may be used in a variety of applications for which traditional batteries or even batteries containing the solid glass electrolyte with no polymer are not suited.

For example, as mentioned above, heat energy-powered batteries may be used in buildings or industrial installations, where they may use solar-generated or waste heat to create electric power.

Heat energy-powered batteries may use solar-generated heat, but unlike, photovoltaic cells, need to be directly exposed to sunlight because, unlike light, the infrared electromagnetic radiation from the sun, which provides heat energy, can travel through opaque materials. Heat energy-powered batteries may be able to transform to electric power the heat generated by the entire spectrum of solar radiation during the day and waste heat during both night and day. This ability provides more installation options as well as lower-cost fabrication and maintenance. In addition, some problems associated with photovoltaic cells may be avoided, such as decreases in performance due to the accumulation of dust and other opaque materials. Furthermore, heat-energy powered batteries may be installed near any heat source, not just on a rooftop In addition, the flexibility of heat energy-powered electrochemical cells and heat energy-powered batteries of the present disclosure may facilitate use in buildings or industrial applications, where custom sizing and curved or sharp features may need to be accommodated.

In some examples, heat energy-powered batteries may be installed in the roof of a building. This allows the heat energy-powered batteries to turn both solar heat energy and waste heat energy escaping the roof of the building to be used to create electric power. The heat energy-powered batteries may be installed as an outer roof layer, or under a protective material, such as shingles or another roofing material. The heat energy-powered batteries may even be installed on the interior roof surface of the building, or under an interior layer, such as a ceiling material. When heat energy-powered batteries are installed on an outer roof layer, the outer roof layer may be adapted to facilitate electric power creation. For instance, the outer roof layer may have an infrared reflectivity designed to maintain the heat energy-powered batteries in a particular temperature range during a portion of daylight hours.

Heat energy-powered batteries may also be installed on or in interior or exterior walls of buildings. For instance, in particularly cold climates where heat energy in the form of waste heat being lost from the structure may be a substantial heat energy source, heat energy-powered batteries may be included in the walls of the structure, or at least the upper portions of walls.

Heat energy-powered batteries may further be included in interior walls surrounding heat-generating equipment, such as water heaters, laundry equipment, fossil fuel-powered automobiles, fossil fuel-powered industrial generators or motors, and other heated or heat-generating industrial equipment.

Heat energy-powered batteries may also be installed around pipes and tanks in homes.

Particularly in industrial settings, heated or heat-generating equipment, particularly pipes and tanks, may be covered with heat energy-powered batteries of the present disclosure.

Heat energy-powered batteries may also be used in wearable electronic devices, such as watches and clothing, where they may create electric power from body heat.

Heat energy-powered batteries may also be used in hand held devices, where heat from the user's hand may be used to create electric power.

Heat energy-powered batteries may be used around or near any combustion device to capture waste heat.

Heat energy-powered batteries may further be used in vehicles, particularly to capture heat from heat-generating components, such as fossil fuel-powered motors, including fossil fuel-powered generators in hybrid electric vehicles. Heat energy-powered batteries may also be located in parts of vehicles that are commonly exposed to sunlight, such as the roofs and hoods of cars, buses, and trucks, the wings and upper fuselage of airplanes and drones, and the decking and upper superstructure of boats, including cargo covers, sails, and solar energy collection structures. Heat energy-powered batteries may also collect waste heat from other energy sources, such as engines, in these and other types of vehicles.

Heat energy-powered batteries may also be used to improve the energy efficiency or practical availability of equipment already adapted for use with rechargeable batteries or photovoltaic cells. For example, power tool batteries may include a heat energy-powered batteries, allowing spare batteries to be recharged simply by placing them in a sunny location at a worksite. Batteries for portable medical equipment, such as is often used by the military, in less-developed locates, or during epidemic responses may be charged in the same manner. In addition, heat energy-powered batteries may enable or extend nighttime use of some portable medical equipment that currently relies on photovoltaic cells by instead allowing the use of body heat or another heat source to create electric power.

Heat energy-powered batteries may also be used in place of photovoltaic cells in grid energy production, such as on solar energy farms. Hybrid energy generation devices, such as devices with photovoltaic cells on top with heat energy-powered batteries underneath to absorb heat energy that passes through the photovoltaic cells are also possible.

Heat from the body and/or the sun may be used to recharge battery-powered mobile devices carried personally or battery powered devices used in remote locations. These devices may include medical equipment, communication devices, or mechanical equipment. Less costly heat energy-powered batteries that transform heat energy into electric power may replace photoelectric devices for the storage of solar-generated electric power in a rechargeable battery or for the production of a chemical commodity such as hydrogen from the electrolysis of water.

In addition, heat energy-powered batteries of the present disclosure are readily combinable with other energy storage components, such as traditional rechargeable batteries or fuel cells, allowing the electric power created using heat energy to be stored for later use, for instance when the ambient temperature has decreased.

EXAMPLES

The following examples are provided to further illustrate the principles and specific aspects of the invention. They are not intended to and should not be interpreted to encompass the entire breath of all aspects of the invention.

Example 1

A heat energy-powered electrochemical cell may be prepared with an aluminum (Al) anode, which may be a metal foil current collector. The foil may also be coated with carbon.

The heat energy-powered electrochemical cell may also have a solid metal polymer/glass electrolyte, which may include sodium polyacrylate as the metal polymer and an $A^+$-glass, where A is lithium (Li), sodium (Na), or potassium (K) as the glass. Specifically, the $A^+$-glass may be formed from a ceramic $A_{3-x}H_xOX$, X=Cl or Br precursor by addition of a small percentage ($\leq 1$ w %) of a hydrated hydroxide such as $Ba(OH)_2 x H_2O$, $x \leq 10$, to form a dry, amorphous-ceramic dielectric electrolyte. The solid metal polymer/glass electrolyte may be formed with an $A^+$-polyacrylate as polymer.

The heat energy-powered electrochemical cell may be prepared with a copper (Cu) cathode, which may be a metal foil collector. The foil may be coated with carbon film.

Such a heat energy-powered electrochemical cell may exhibit self-charge, a long self-charge/discharge cycle life, mechanical robustness and tolerance of heat fluctuations, changing ambient-air environments, water, and mechanical abuse. Such a heat energy-powered electrochemical cell may also be easy to fabricate, even as a large surface area sheet, such as in a large-area thin cell.

Figure 2:
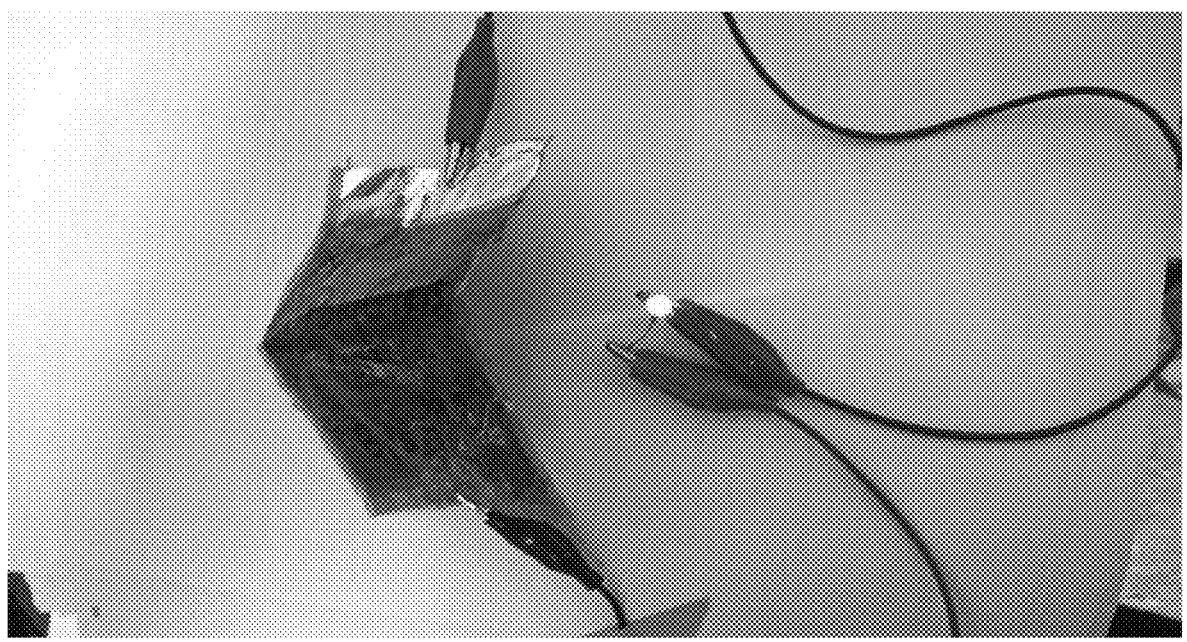
FIG. 2 is a photograph of a heat energy-powered Al/Na+-glass+polymer/Cu electrochemical cell powering an LED.

Such a heat energy-powered electrochemical cell is illustrated in FIG. 2 lighting a red light-emitting diode (LED) even though the cell membrane is bent by nearly 90°. This example illustrates the mechanically robust nature of the solid metal polymer/glass electrolyte in a heat energy-powered electrochemical cell as well as the ability to deliver electric-power without the application of an external $P_{ch}$. However, the cell was first charged and fully discharged before the demonstration was made. It should be noted that neither electrode initially contained the mobile $A^+$ cation of the electrolyte. The notation for a cell is as follows: cathode/electrolyte/anode.

Example 2

A heat energy-powered electrochemical cell was prepared with a metallic sodium (Na) anode, a solid metal polymer/glass electrolyte, which included 10 wt % sodium polyacrylate as the metal polymer and a $Na^+$-glass as the glass, and Cu foam cathode containing manganese oxide ($MnO_2$) and carbon (C). The anode and cathode originally lacked $Na^+$ working cation.

$MnO_2$ particles in the cathode determine the dominant potential of the cathode and were not reduced by discharge of the heat energy-powered electrochemical cell. The cell exhibited a self-charge with a $V_{dis} \approx 3.0$ V.

Example 3

A heat energy-powered electrochemical cell was prepared with an Al anode, a carbon and Cu cathode that originally lacked the $Na^+$ working cation, a solid metal polymer/glass electrolyte, which included 10 wt % sodium polyacrylate as the metal polymer and a $Na^+$-glass as the glass. The cell was cut into two or more pieces that were connected in series to form multicell batteries that powered red, white, and blue LEDs using electric power derived from heat energy.

Example 4

A heat energy-powered electrochemical cell was prepared as in Example 3, but with a carbon felt cathode. This electrochemical cell was demonstrated to transform ambient heat into electric power at 25° C.

Example 5

A heat energy-powered electrochemical cell was prepared as in Example 3, but with a carbon on copper foam cathode. This electrochemical cell was demonstrated to transform ambient heat into electric power at 25° C.

Example 6

A heat energy-powered electrochemical cell may be prepared with an Al anode, a solid metal polymer/glass electrolyte, which included 10 wt % sodium polyacrylate as the metal polymer and a $Na^+$-glass as the glass, and a Cu foil cathode. The anode and cathode originally lacked $Na^+$ working cation.

The heat energy-powered electrochemical cell was fabricated as a large-area thin cell. The discharge current ($I_{dis}$) of this cell increased a factor of seven after being transported from an air-conditioned laboratory to outdoor solar heat at approximately 30-40° C. delivered through a protective plastic cover.

In addition, the large-area thin cell increased its discharge voltage ($V_{dis}$) with increasing temperature from 0 V at 25° C. to 0.91 V at 72° C.

Example 7

A heat energy-powered electrochemical cell may be prepared with a metallic lithium (Li), a solid metal polymer/ glass electrolyte, and a flow-through cathode. The heat energy-powered electrochemical cell functioned with the solid metal polymer/glass electrolyte as a separator.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A vehicle comprising:
a heat-generating component, a part commonly exposed to sunlight, or both; and
a heat energy-powered electrochemical cell comprising:
an anode;
a cathode; and
a solid metal polymer/glass electrolyte, wherein the metal polymer and the glass electrolyte are intermixed with each other comprising:
between 1% and 50% metal polymer by weight as compared to total solid metal polymer/glass electrolyte weight; and
between 50% and 90% solid glass electrolyte by weight as compared to the total solid metal polymer/glass electrolyte weight, wherein the solid glass electrolyte comprises:
a working cation; and
an electric dipole.

2. The vehicle of claim 1, wherein the vehicle comprises a heat-generating component and the heat energy-powered electrochemical cell is positioned to capture heat from the heat-generating component.

3. The vehicle of claim 1, wherein the vehicle comprises a part commonly exposed to sunlight and the heat energy-powered electrochemical cell is located in the part commonly exposed to sunlight.

4. The vehicle of claim 3, wherein the part commonly exposed to sunlight comprises a roof or hood of a car, bus, or truck.

5. The vehicle of claim 3, wherein the part commonly exposed to sunlight comprises a wings or upper fuselage of an airplane or drone.

6. The vehicle of claim 3, wherein the part commonly exposed to sunlight comprises the decking or upper superstructure of a boat.

7. The vehicle of claim 6, wherein the decking or upper superstructure of a boat comprises cargo covers, sails, and solar energy collection structures.

8. The vehicle of claim 1, wherein the vehicle comprises an energy source that generates waste heat and the heat energy-powered electrochemical cell is positioned to capture the waste heat.

9. The vehicle of claim 8, wherein the energy source that generates waste heat is comprises an engine.

10. The vehicle of claim 1, wherein the heat energy-powered electrochemical cell delivers, at a given temperature or within a given temperature range, at least 85% as much electric power ($P_{dis}$) as an electrochemical cell having the same anode, the same cathode, and the solid glass electrolyte but lacking the metal polymer.

11. The vehicle of claim 1, wherein the heat energy-powered electrochemical cell delivers, at a given temperature or within a given temperature range, at least 125% as much electric power ($P_{dis}$) as an electrochemical cell having the same anode, the same cathode, and the solid glass electrolyte but lacking the metal polymer.

12. The vehicle of claim 1, wherein the heat energy-powered electrochemical cell has a Young's modulus of less than 120 GPa/mm².

13. The vehicle of claim 1, wherein the solid metal polymer/glass electrolyte has a Young's modulus of less than 120 GPa/mm².

14. The vehicle of claim 1, wherein the heat energy-powered electrochemical cell has a surface area of a largest external surface of at least 1 m².

15. The vehicle of claim 1, wherein the solid metal polymer/glass electrolyte has an ionic conductivity that is at least 25% of the ionic conductivity of the solid glass electrolyte at 25° C.

16. The vehicle of claim 1, wherein the anode comprises a metal foil.

17. The vehicle of claim 1, wherein the anode comprises carbon.

18. The vehicle of claim 1, wherein the metal polymer comprises a metal polyacrylate.

19. The vehicle of claim 18, wherein the metal polyacrylate comprises sodium polyacrylate.

20. The vehicle of claim 1, wherein the metal polymer comprises a metal polyethylene glycol.

21. The vehicle of claim 1, wherein the metal in the metal polymer comprises sodium (Na), lithium (Li), or aluminum (Al).

22. The vehicle of claim 1, wherein the solid metal polymer/glass electrolyte adheres to the cathode, the anode, or both.

23. The vehicle of claim 1, wherein the working cation comprises lithium ion ($Li^+$), sodium ion ($Na^+$), potassium ion ($K^+$) magnesium ion ($Mg^{2+}$), copper ion ($Cu^+$), or aluminum ion ($Al^{3+}$).

24. The vehicle of claim 1, wherein the dipole has the general formula $A_yX_z$ or the general formula $A_{y-1}X_z^{-q}$, wherein A is Li, Na, K, Mg, and/or Al, X is S and/or O, 0<z≤3, y is sufficient to ensure charge neutrality of dipoles of the general formula $A_yX_z$, or a charge of −q of dipoles of the general formula $A_{y-1}X_z^{-q}$, and 1≤q≤3.

25. The vehicle of claim 24, wherein the dipole comprises up to 50 wt % of the solid glass electrolyte weight of a dipole additive.

26. The vehicle of claim 25, wherein the dipole additive comprises one or a combination of compounds having the general formula $A_yX_z$ or the general formula $A_{y-1}X_z^{-q}$, wherein A is Li, Na, K, Mg, and/or Al, X is S, O, Si, and/or OH, 0<z≤3, y is sufficient to ensure charge neutrality of dipole additives of the general formula $A_yX_z$, or a charge of −q of dipole additives of the general formula $A_{y-1}X_z^{-q}$, and 1≤q≤3.

27. The vehicle of claim 1, wherein the cathode comprises a metal foil.

28. The vehicle of claim 1, wherein the cathode comprises carbon.

29. The vehicle of claim 1, wherein the cathode comprises a metal foam.

30. The vehicle of claim 1, wherein the cathode comprises a metal oxide.

31. The vehicle of claim 1, further comprising a rechargeable battery or fuel cell electrically connected to the heat energy-powered electrochemical cell.

* * * * *